(12) United States Patent
Krishnan

(10) Patent No.: US 6,278,454 B1
(45) Date of Patent: Aug. 21, 2001

(54) CALL PROGRESS GRAPHICAL USER INTERFACE

(75) Inventor: Shankarnarayan Krishnan, San Gabriel, CA (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/160,447

(22) Filed: Sep. 24, 1998

(51) Int. Cl.$^7$ ........................................................ G06F 3/00
(52) U.S. Cl. .................. 345/349; 345/326; 345/339; 345/352; 345/356; 379/100.05; 379/100.06
(58) Field of Search .................... 345/356, 352, 345/353, 339, 326, 349, 969, 970; 379/100.05, 100.06, 164

(56) References Cited

U.S. PATENT DOCUMENTS

| | | | |
|---|---|---|---|
| 4,653,090 | 3/1987 | Hayden | 379/204 |
| 5,533,110 | 7/1996 | Pinard et al. | 379/201 |
| 5,627,978 | * 5/1997 | Altom et al. | 345/330 |
| 5,754,636 | * 5/1998 | Bayless et al. | 379/142 |
| 5,923,737 | * 7/1999 | Weishut et al. | 345/330 |
| 5,940,488 | * 8/1999 | Degrazia et al. | 379/201 |
| 5,943,055 | * 8/1999 | Sylvan | 345/349 |

FOREIGN PATENT DOCUMENTS

| | | |
|---|---|---|
| WO 97/08879 | 3/1997 | (WO) . |
| WO 98/21871 | 5/1998 | (WO) . |

OTHER PUBLICATIONS

Nietzer et al., "Ein ISDN–Endgerät Mit Graphisher Telefonoberfläche", ITG–Fachberichte, De, VDE Verlag, Berlin, vol. 113, p. 145–152.

* cited by examiner

Primary Examiner—Raymond J. Bayerl
Assistant Examiner—Cuong T. Thai
(74) Attorney, Agent, or Firm—Jenkens & Gilchrist, P.C.

(57) ABSTRACT

Improved methods and arrangements are provided for actively monitoring and/or controlling calls and related features in a communications system, such as, for example, computer telephony system. A graphical user interface (GUI) is provided to visually represent the telephony resources, features, services, and users prior to, during, and after a call. An operator can interface with the computer telephony system through the selective activation and/or manipulation of graphical and iconic representations of the call, the calling party, and called party as provided through the GUI.

27 Claims, 16 Drawing Sheets

CALL PROGRESS GRAPHICAL USER INTERFACE

BACKGROUND OF THE INVENTION

1. Technical Field of the Invention

The present invention relates generally to communication systems, and more specifically to methods and arrangements that can be employed in computer telephony systems to graphically depict incoming and outgoing calls as they occur, preferably in a manner that allows a user and/or an operator to better monitor and control the calls.

2. Description of Related Art

Computer telephony systems are becoming increasingly popular because they provide specific services, which in the past would have been cost prohibitive if provided by traditional telephone systems. Essentially, a computer telephony system includes technologies that actively integrate computers and like devices to function as would a traditional telephone system and/or private branch exchange (PBX), but only on a smaller scale and/or at a significantly lower cost. While a computer telephony system can be a stand alone communication system, for example within a home or small business environment, it is more likely to also be connected to existing telecommunications systems, such as a public switched telephone network (PTSN), and/or other data networks, such as a local area network (LAN). As such, most computer telephony systems are configured to provide users with several communication related features. Indeed, the inherent flexibility of a programmable computer telephony system allows for specialized and/or customized communication features to be provided, often with only a modest attendant increase in cost.

Of particular interest within computer telephony systems is the increased demand from users to integrate new and different types of devices and the need to support the portability of these devices. The increase in demand for mobile cellular radio telephones, personal digital assistants (PDAs), pagers, e-mail services, and facsimile services are prime examples of the changing requirements that users present, even in a small home and/or small business environment.

The resources available within a computer telephony system are uniquely positioned to meet the future needs of these service-rich users. To support these and other types of needs, however, there is a need to understand how the computer telephony system's resources are being utilized. This not only assists in determining where problems or potential problems might be occurring, but also allows for a more complete understanding of the users and their needs and how to best address them. Thus, at the simplest level, it is important to know how, for example, a call is being placed and handled within the operating environment of the computer telephony system.

In larger more complicated telephone or PBX environments obtaining such information and monitoring/controlling the operation of the overall system can be very complicated. As such, these tasks are typically left to automated programs, experienced operators and maintenance personnel. For example, monitoring and controlling functions are typically provided through one or more applications running on one or more computers within the telephone or PBX system. Indeed, a significantly large portion of the computing resources within such a system can be devoted to, or are otherwise involved with, monitoring, logging and reporting call activity.

The information presented by such call activity applications tends, however, to be limited in scope due in part to the high level of traffic. Thus, information that may be important can become lost or otherwise made substantially difficult to extract and analyze, especially on a real time basis. For example, information about an incoming or outgoing call and the resources employed is typically not easily accessible to an operator, and the information that is available are typically not easily understood by less skilled operators. Moreover, seldom would such information have been made available to the system's users.

Even in relatively smaller communication environments, such as a PBX environment, it is often difficult to track the incoming and outgoing calls on a real-time basis or to monitor the various features, such as voice mailbox access. Indeed, in most typical systems the existence of a telephone call often require that an inference be made based on the reported states of the switching devices making or receiving the call. Thus, to an operator, the call itself is, at best, only indirectly represented during its lifetime. More detailed analysis is typically performed through the subsequent processing of collected data within the systems reports and logs. For example, data that describes the source and destination parties is typically post processed to determine the call's duration and associated cost.

As can be appreciated, in order to support current and future needs in a smaller scale, feature-rich computer telephony system, there is a need for improved methods and arrangements that allow for dynamic, real-time monitoring and analysis of a call or calls. Preferably, the improved methods and arrangements will provide increased information about the call and present the information to an operator and/or users through a user-friendly interface that allows for a quick determination of the participants engaged in the call and the resources being utilized. Furthermore, there is a need for improved methods and arrangements that provide additional control over the various resources or features within the computer telephony system.

SUMMARY OF THE INVENTION

The present invention provides improved methods and arrangements for use in a communications system, such as a computer telephony system. In accordance with certain aspects of the present invention, a user-friendly, graphical user interface (GUI) is provided that allows an operator to visually monitor and analyze a call. The GUI also provides a mechanism for the operator, and in certain cases the users, to control various aspects of each call and other telephony related features within the computer telephony system.

In accordance with certain embodiments of the present invention, therefore, computer instructions within a GUI and other related telephony applications are provided in the form of a computer readable medium for use in a computer telephony system having at least one processor configured to respond thereto. The GUI provides a graphical and visual representation of a call and the resources involved in handling the call on a display device coupled to the processor.

For example, in accordance with certain embodiments of the present invention a call progress display graphically depicts a grouping of all of the participants involved in a call, together with distinct representations for the different states of the resources engaged in the call. By way of further example, the call progress display generated by the GUI contains cells that represent participants and/or resources engaged in the call, and graphical links connected between these cells. In certain embodiments, for example, iconic representations of the various resources are graphically displayed within these cells.

Thus, by detecting various call activities within the computer telephony system and providing such information to the GUI, each call can be graphically displayed during its progress, duration, and can even be recalled later for additional analysis. Furthermore, features associated with the call, the resources and/or the users can be invoked or otherwise controlled through one or more input devices and the GUI.

The information that is displayed through the GUI can vary, depending upon the computer telephony system, resources, and the operational and user needs. By way of example, the GUI can graphically display additional identifying information about the participants engaged in the call, the device used to originate the call, the device which first received the call, the types and states of devices and automated features subsequently participating in the call, and other telephony operations/services associated with each of the devices participating in the call.

In accordance with still other aspects of the present invention, the GUI is further configured to provide the operator and/or users with manual or automated control capabilities to actively direct the call's flow and add or delete call participants to the call.

In accordance with certain embodiments of the present invention, the GUI is installed within a personal computer (PC) operating under a Windows 98 or like environment. The PC is coupled to a telephony base station that provides telephony functions to one or more devices and provides connections to external networks.

BRIEF DESCRIPTION OF THE DRAWINGS

A more complete understanding of the methods and arrangements in accordance with certain embodiments of the present invention may be had by reference to the following detailed description when taken in conjunction with the accompanying drawings wherein.

DETAILED DESCRIPTION OF THE PRESENTLY PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
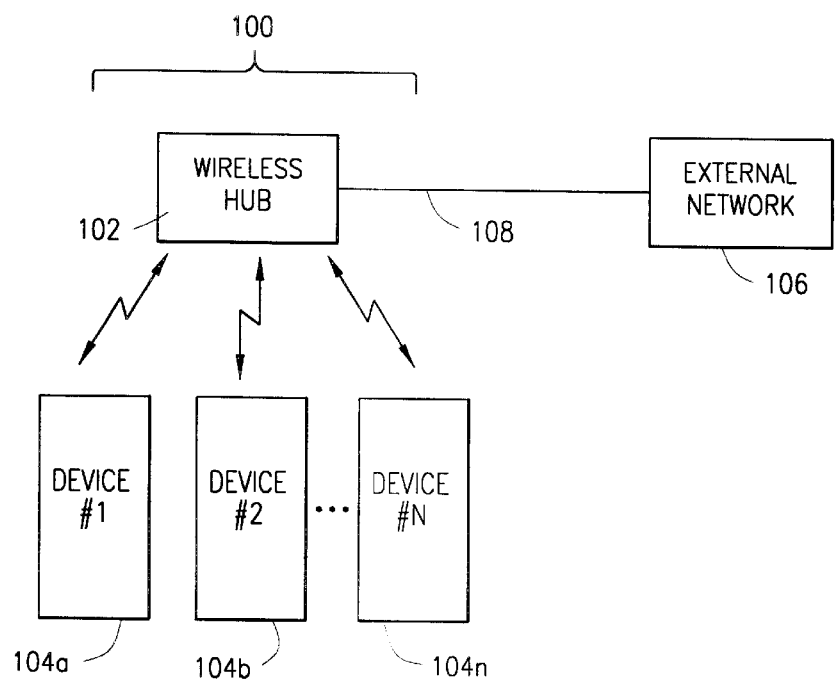
FIG. 1 is a block diagram depicting a telephony arrangement having a wireless hub arrangement that is arranged to provide telephony functions, in accordance with certain embodiments of the present invention.

FIG. 1 is a block diagram depicting a computer telephony system 100 that is arranged to provide voice and/or data communications to a plurality of local users. In order to accomplish this task, computer telephony system 100 includes a hub 102 that is arranged to provide telephony functions, e.g., wireless communications, to a plurality of users through devices 104a–n. Although not shown, hub 102 can also be arranged to support wired communications to other devices.

As depicted, hub 102 is connected to at least one external network 106 through one or more wire or fiber lines 108. In other embodiments, lines 108 can also include wireless connections. In this manner, computer telephony system 100 is configured to provide telephony services through one or more telecommunications networks. Hub 102, therefore, provides the signal interfacing, switching, monitoring, and controlling functions as required to support the various telephony services, features and operations.

By way of example, in accordance with certain embodiments of the present invention, external network 106 can be any type of communications network that is arranged to provide communications with remote users and/or devices, such as, a public switched telephone network (PTSN). Additionally, external network 106 in certain further embodiments includes or otherwise provides an interface to other external network resources such as an intranet and/or the Internet.

Devices 104a–n can include any type of communication device that is configured for accessing a computer telephony system. By way of example, device 104a can be a wireless telephone or pager type of device, device 104b can be a modem-configured computing device such as a portable computer or personal digital assistant type of device. Devices 104a–n are typically configured to transmit and receive (i.e., exchange) information in the form of either analog or digital data through hub 104, lines 108 and the various resources provided by external network 106.

Figure 2:
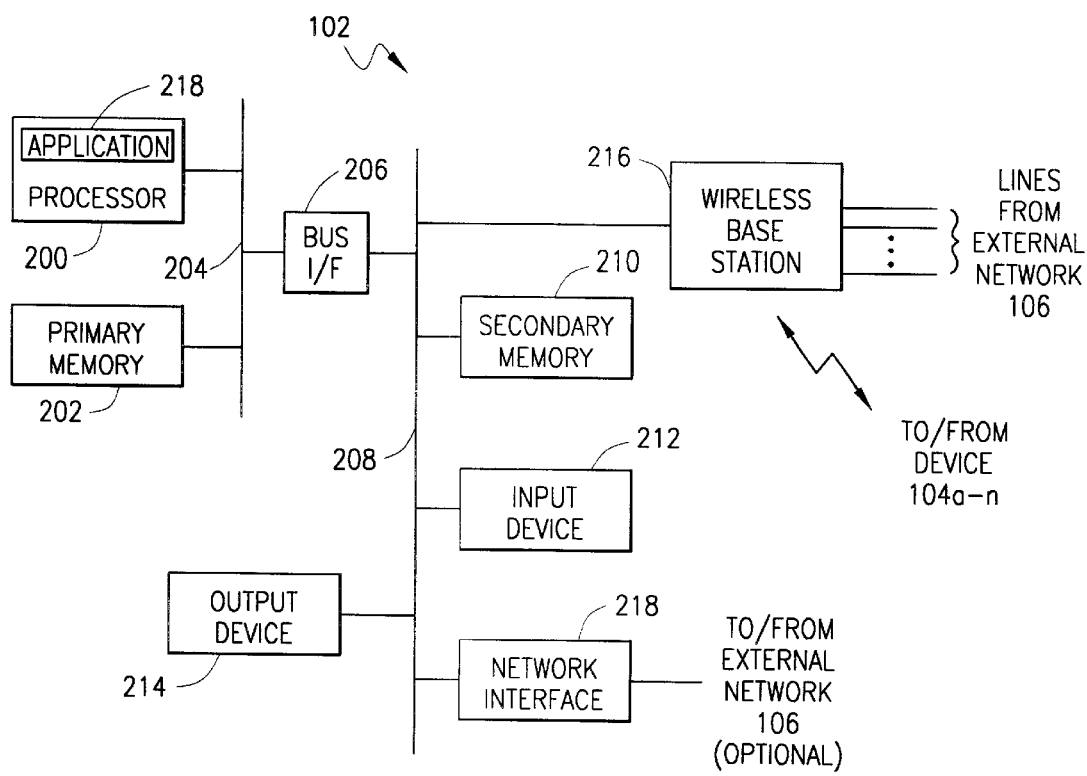
FIG. 2 is a block diagram depicting an exemplary wireless hub arrangement, as in FIG. 1, having a computer system configured to run a graphical user interface (GUI) application, a base station device, and at least one user device, in accordance with certain embodiments of the present invention.

FIG. 2 is a block diagram depicting an exemplary hub 102 that is based primarily on a computer architecture, such as, for example, that found in a contemporary personal computer (PC) or like computer system. Indeed, in accordance with certain preferred embodiments of the present invention, hub 102 includes a conventional PC that is connected to a base station 216 and configured to run one or more telephony applications, including a GUI application.

Referring to the exemplary embodiment depicted in FIG. 2, within hub 102 there is at least one processor 200 that is connected to a primary memory 202 through a first bus 204. Processor 200, for example, can be a microprocessor, such as a Pentium II microprocessor available from Intel Corporation of Santa Clara, Calif. Processor 200 is configured to access primary memory 202 through first bus 204. Primary memory 202 includes random access memory (RAM), such as, dynamic random access memory (DRAM), which is configured to store data associated with at least one application 218 that runs in processor 200.

As shown in FIG. 2, first bus 204 is further interfaced to a second bus 208, through a bus interface (I/F) 206. By way of example, second bus 208 can be a Universal Serial Bus (USB), a Peripheral Component Interconnect (PCI) bus, an Industry Standard Architecture(ISA) bus, or other similar bus.

A plurality of devices can be connected to second bus 208. For example, as depicted, a secondary memory 210 can be connected to second bus 208 to provide additional data storage. Secondary memory 210 can include, for example, additional RAM, DRAM, static random access memory (SRAM) (e.g., flash memory), a disk or tape drive and associated magnetic or optomagnetic storage medium, an optical storage drive and optical storage medium, or other like storage device.

At least one input device 212 is also connected to second bus 208 and configured to accept inputs from an operator. Input device 212 can include, for example, a keyboard device, a mouse device, a trackball device, a pen device, a pointing device, a touch sensitive input device, a microphone device, or other like input device. The inputs from input device 212 are then provided to processor 200, application 218, or any of the other applicable connected devices in FIGS. 1 and 2.

At least one output device 214 is also connected to second bus 208. Output device 214 is configured to generate an output suitable for use by a user (with or without additional devices) in response to one or more signals from processor 200. By way of example, output device 214 can include a cathode-ray tube (CRT) generated display, flat panel display, a printer, an audio monitor, or other like devices. In accordance with certain preferred embodiments of the present invention, output device 214 includes a display device such as a CRT or flat panel display.

Hub 102 also includes a base station 216 that is configured to support telephony operations within computer telephony system 100. As shown, base station 216 is connected to second bus 208. Base station 216 includes, for example, a switch matrix and associated processing and/or interface circuitry (not shown). In a wireless hub arrangement 100, such as that depicted in FIG. 1, base station 216 also includes transceiver circuitry that supports the wireless communications to/from devices 104a–n. Base station 216 also provides an interface to lines 108.

Base station 216 is configured to exchange information and to respond to one or more commands from application 218 to selectively control the switch matrix as required to support various telephony operations. To accomplish this, base station 216 is configured to provide status information about the telephony operations, e.g., information about a call, and status information about or from the various devices 104a–n.

An optional network interface device 218 is also connected to second bus 208 to provide additional non-telephony communications between processor 200, for example, a local area network (LAN) (not shown).

Although second bus 208 is depicted as connecting several different devices to first bus 204 and processor 200, it is to be understood that this is only an exemplary configuration, and that certain additional embodiments in accordance with the present invention use a plurality of buses, direct interfaces, and/or shared interfaces between the various devices.

Further, it is to be understood that additional devices can be connected to or otherwise provided in hub 102 as needed to support wired or wireless communications and/or other networking capabilities.

Reference will now be made to FIGS. 3–14, each of which depicts a screen shot of an exemplary call progress display 300 as generated on output device 214 in response to at least graphical user interface (GUI) application 218 running on processor 200, in accordance with certain exemplary embodiments of the present invention.

Figure 3:
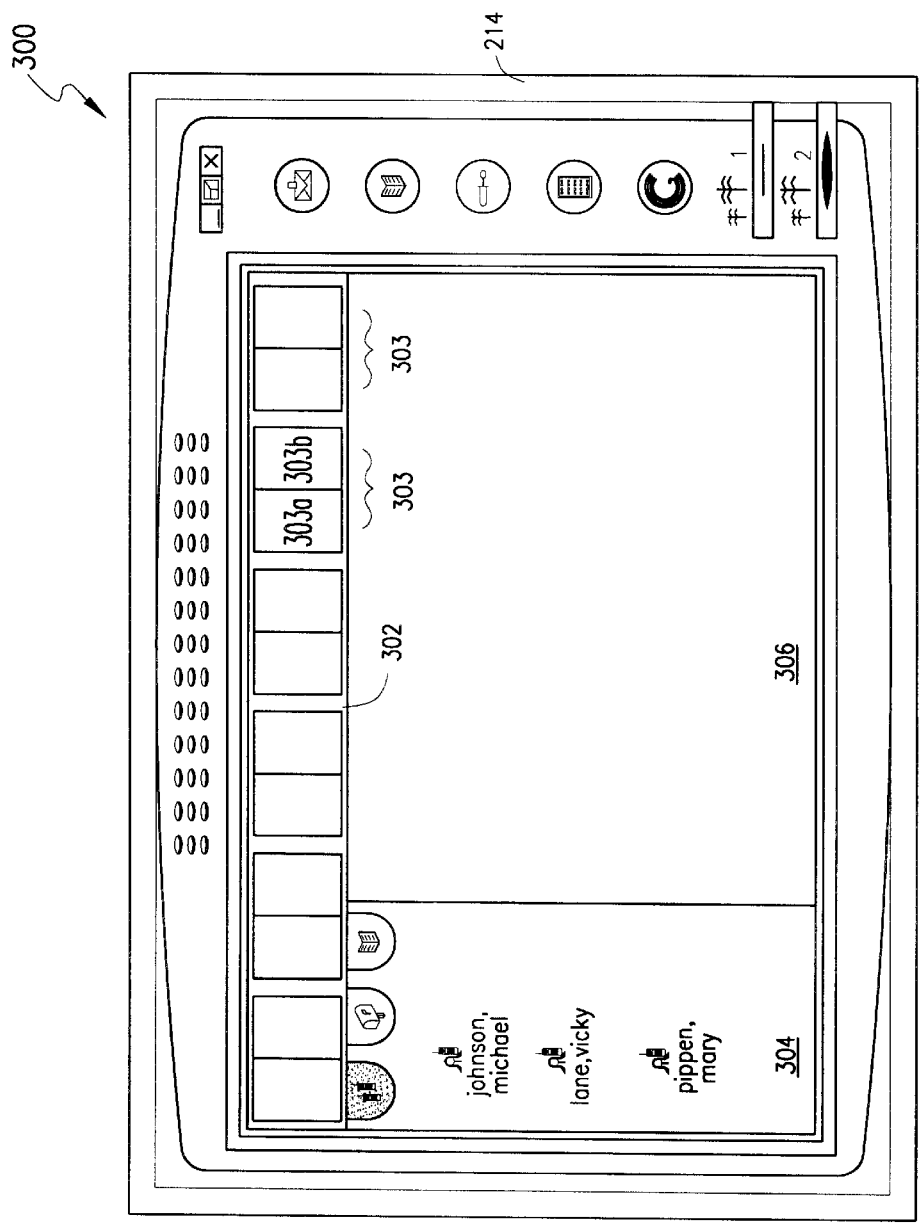
FIG. 3 depicts a graphical representation of an exemplary call progress screen as displayed on the display device in the computer system in FIG. 2 in response to the GUI application, in accordance with certain embodiments of the present invention.

Call progress display 300 is essentially a graphical representation of calls in progress in computer telephony system 100. As depicted in FIG. 3, call progress display 300 includes a miniature call panels area 302, a resource panel 304, and a main call view area 306.

Within the miniature call panels area 302, there are a plurality of miniature panels 303 that depict summary call activity within computer telephony system 100. Each miniature panel 303 consists of two cells 303a and 303b. The first cell 303a represents the call initiator and the second cell 303b represents the call receiver.

Figure 4:
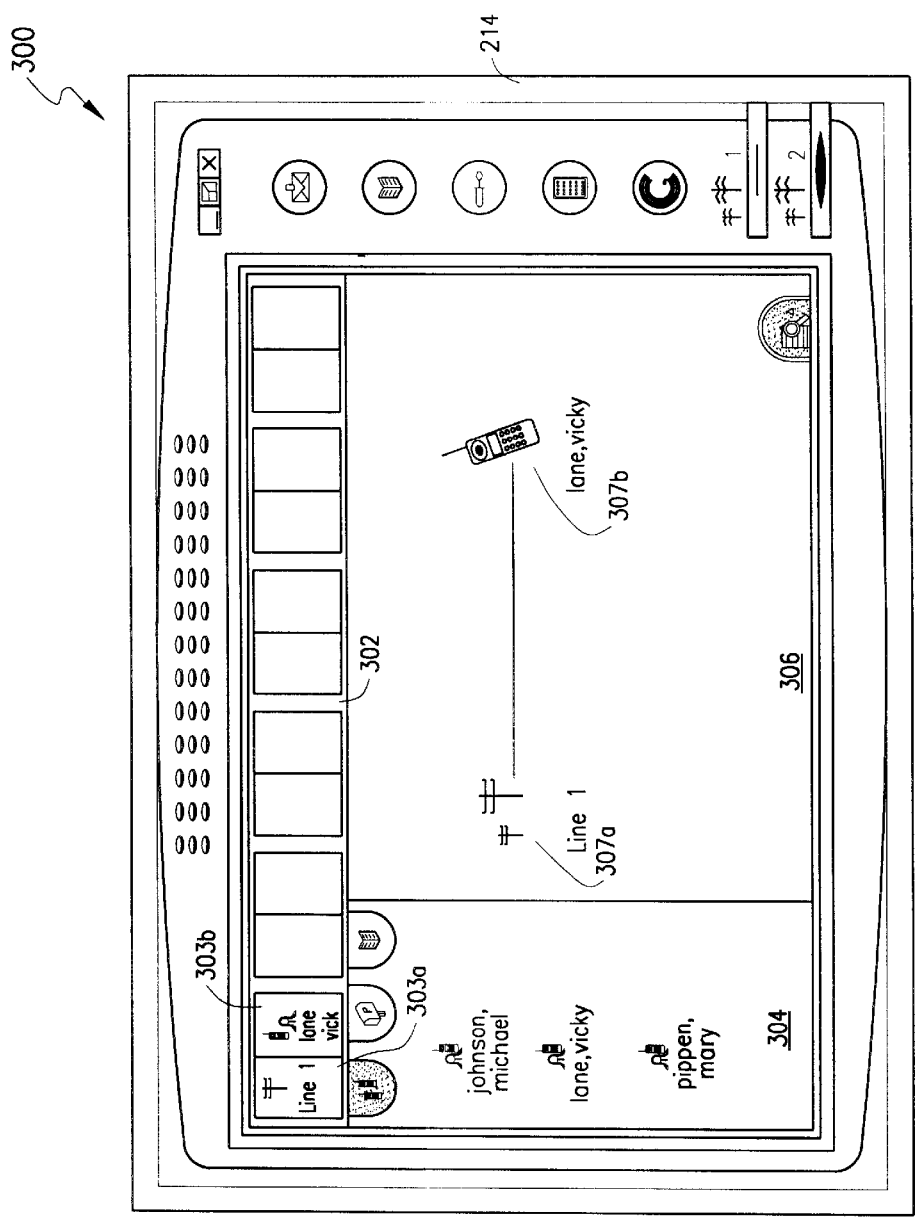
FIG. 4 depicts the call progress screen of FIG. 3 showing an incoming call, in accordance with certain embodiments of the present invention.

As depicted in FIG. 4, for example, when a call appears in computer telephony system 100, either because of a user initiating a call or because of an external party initiating the call, the call is displayed in the miniature panel 303. Each of the cells 303a–b contains an icon and a caption identifying the call initiator and the call receiver, and the type of these participants (e.g,. the type of device or feature).

As additional calls appear in the system, they each take up an empty miniature panel 303. When a call ends, the miniature panel 303 displaying the call is freed up. Each of the miniature panels 303 is updated to reflect the entry and exit of call participants into and from the call. In this manner, at any given time the miniature call panels 303 reflect the two active participants in a call.

The main call view area 306 displays the call participants. Each participant has an iconic representation 307 to indicate the type of device 104a–n (e.g., handset, mailbox, IVR agent, external caller, etc.) and the current state (e.g., ringing, connected, on-hold, etc.) of the call participant. For example, as depicted in FIG. 4, an incoming call over line number 1 is shown as ringing the called user's handset as depicted by icon 307b.

Figure 5:
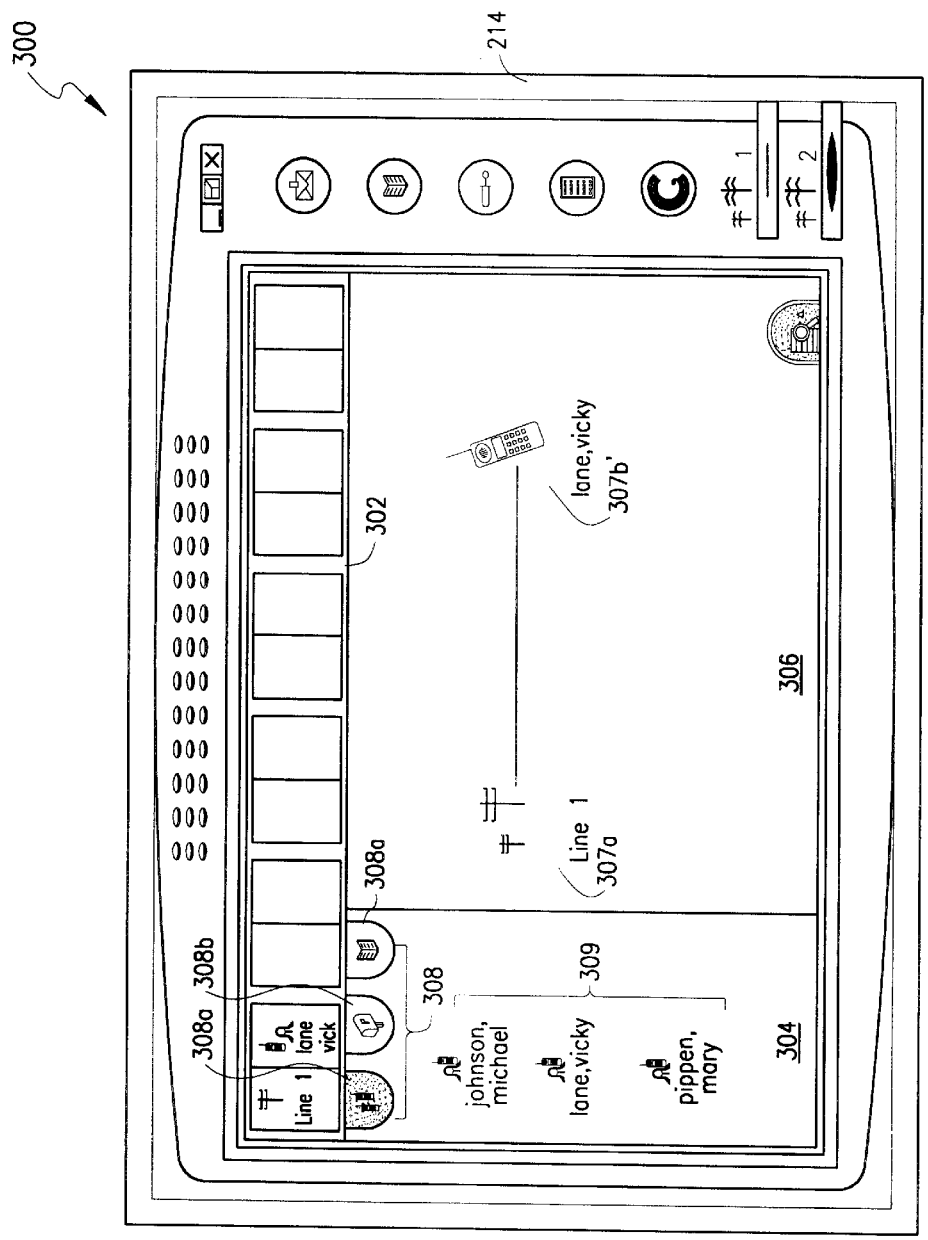
FIG. 5 depicts the call progress screen of FIG. 3 showing a connected incoming call, in accordance with certain embodiments of the present invention.

As the state of the call participant changes, the icon representing the participant changes. Thus, as depicted in FIG. 5, the icon 307b represents that the called user has changed state (e.g., vertical orientation versus tilted orientation), thereby identifying that the incoming call has been answered. In accordance, certain embodiments of the present invention, icons, such as icons 307a, 307b and/or 307b can also be animated to indicate a state, which requires user or operator attention (e.g., blinking, jiggling, color changes, enlarging, etc).

As participants enter and exit from a call, the iconic representations are either added or removed from the call progress display 300. The relative positions of the call participants in the main call area 306, for example, within cells arranged in a pattern such as a semi-circle, illustrate the order in which the participants entered the call (i.e., see FIG. 8b).

An additional feature of the main call area 306 is the ability for an operator to invoke call control commands from the device (e.g., 104a–n) belonging to a call participant. For example, as the operator moves a cursor over the icon representing a call participant, a menu of commands is displayed. The commands in such a menu can include, for example, various telephony commands (e.g., Transfer, Redirect, Conference, etc.,) which are valid for the current state of that participant.

When a command is selected from the menu, for example, by clicking the appropriate menu item, the command is immediately invoked, provided no further input is required. Otherwise, the operator is prompted through visual and/or audio cues, for example, to select a call destination appropriate for a given command. Once the operator has made a valid selection the command is invoked.

As depicted in FIG. 5, for example, resource panel 304 on the far left-hand side of display 300 includes a plurality of tabs 308. The first is a handsets tab 308a that, when selected by the operator, displays a list of all users in the system with a handset device. The second is a mailboxes tab 308b that, when selected by the operator, displays a list of all users with a voice mailbox. The third is a contacts tab 308c, that when selected by the operator, displays a list of contacts entered in the address book of the system.

Figure 12:
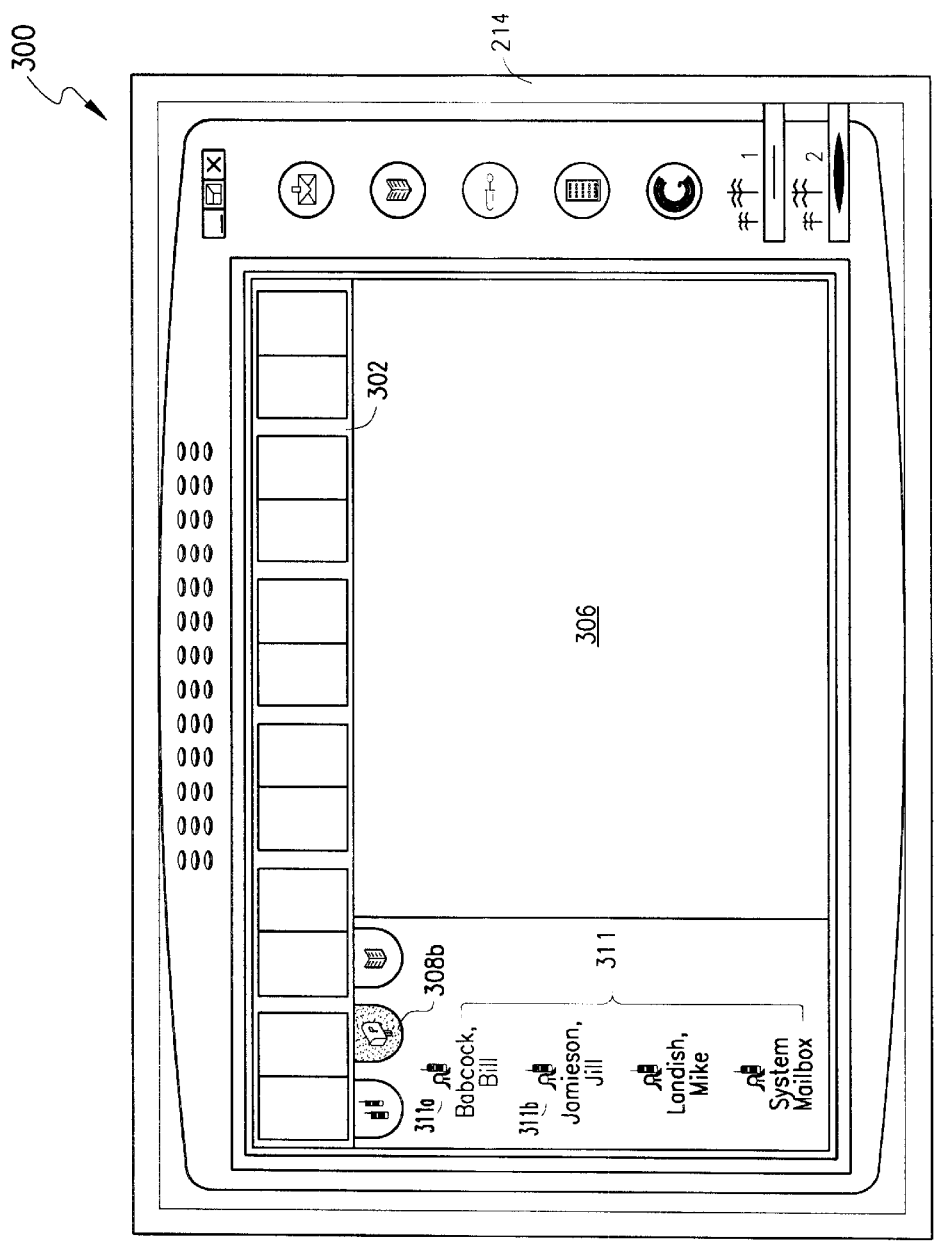
FIG. 12 depicts the call progress screen of FIG. 3 showing a voice mail box information feature, in accordance with certain embodiments of the present invention.

The operator can click on the appropriate tab 308 to look at a particular list. For example, as depicted in FIG. 5, when handsets tab 308a is selected, a list of users 309 with handsets is displayed in resource panel 304. In FIG. 12, for example, when mailboxes tab 308b is selected, a list of users with mailboxes 311 is displayed in resource panel 304. Finally, referring to FIG. 13a, when contacts tab 308c is selected, a list of contacts 313 is displayed in resource panel 304. List of contacts 313 can include information, such as, for example, the name, company name and the default phone number assigned to each contact. From the list of contacts 313 the user can also selectively access pop-open, pull-down, or like types of menus (not shown) that include all the dialable numbers assigned to a contact.

When prompted to choose a call destination, the operator can either click the icon representing the call destination of choice or in the case of a contact, select one of many possible numbers assigned to a contact. The contacts can also be sorted by first name, last name, and company name or telephone number, for example, as depicted in FIG. 13b using menu 315.

Another feature that is provided is a call detail window 317, which contains a chronology of events that are related to the call being displayed in the main call view area 306. The call detail window 317 is popped open by clicking on a button 319 in the lower right corner of the main call view area 306, as shown, for example, in FIGS. 14a–b. Upon clicking this button, call detail window 317 is opened, as depicted, for example, in FIG. 14b. This window contains a chronological or similar listing of call events that have occurred with regard to the call. Each event entry 321 in this window describes what happened in the system in the context of the call. By reading through this chronology of events, the operator can build a mental picture of the call flow. This feature can be useful in explaining such things as who initiated the call, how the call was routed, and how each individual participant interacted with the call or directed the flow of the call.

Several exemplary call progress display 300 related telephony features, such as those described above and others, will now be discussed with reference to the exemplary screen shots of FIGS. 3–14.

FIG. 3 depicts a default call progress screen in which the resource panel 304 is in the handset mode and displays all handsets (i.e., devices 104a–n) that are currently subscribed to the computer telephony system 100.

Figure 6:
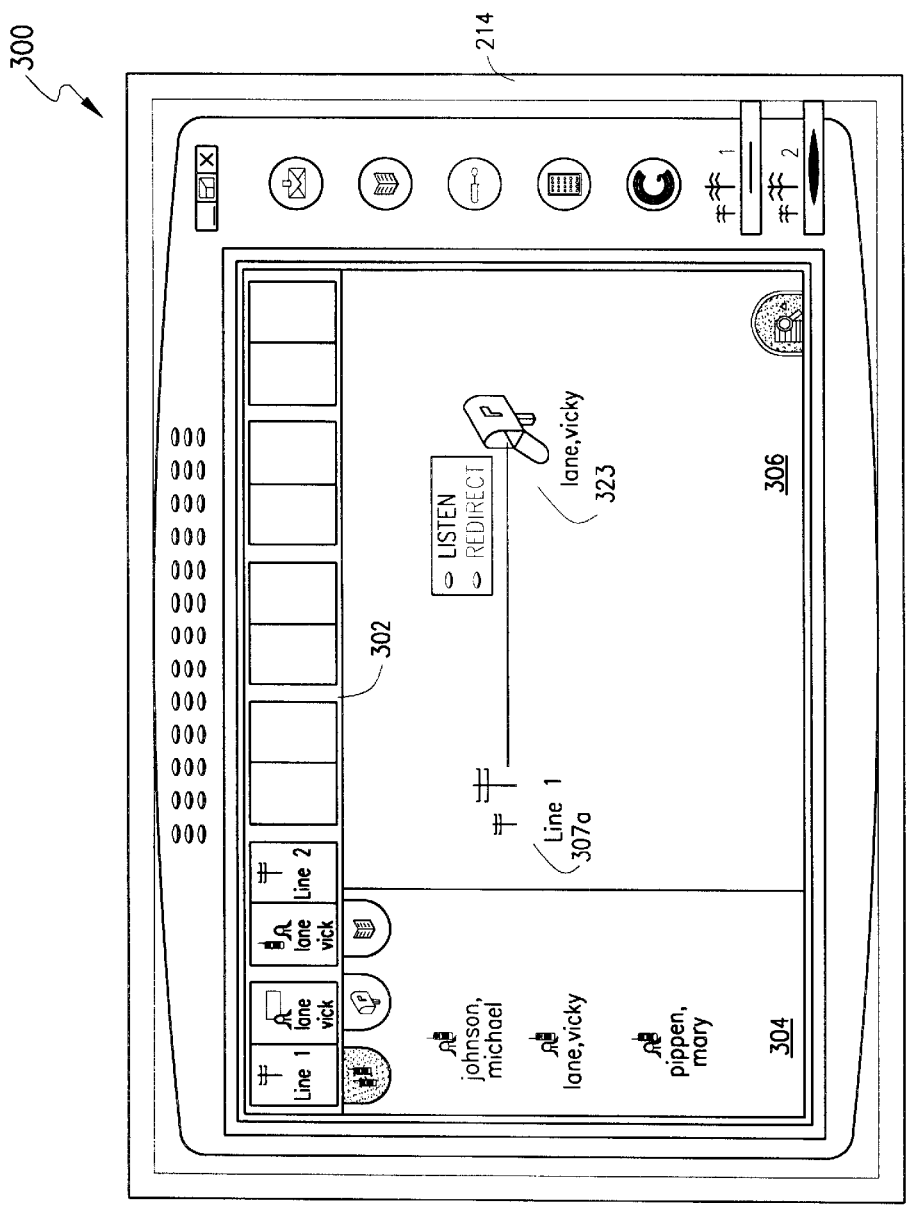
FIG. 6 depicts the call progress screen of FIG. 3 showing a call directed to a voice mail service, in accordance with certain embodiments of the present invention.

In FIG. 4, an incoming call on Line 1 is depicted as it is routed to a subscribed handset in the computer telephony system. Next, as shown in FIG. 5, the incoming call on Line 1 is depicted as having been answered by a person with access to a subscribed handset in the computer telephony system. Alternatively, as depicted in FIG. 6, if the incoming call to the subscribed handset is not answered then, the incoming call on Line 1 is depicted as having been routed to the voice mail box 323 for the subscribed handset. Here, the operator can listen in on the voice mail message and/or redirect the call as needed.

Figure 7:
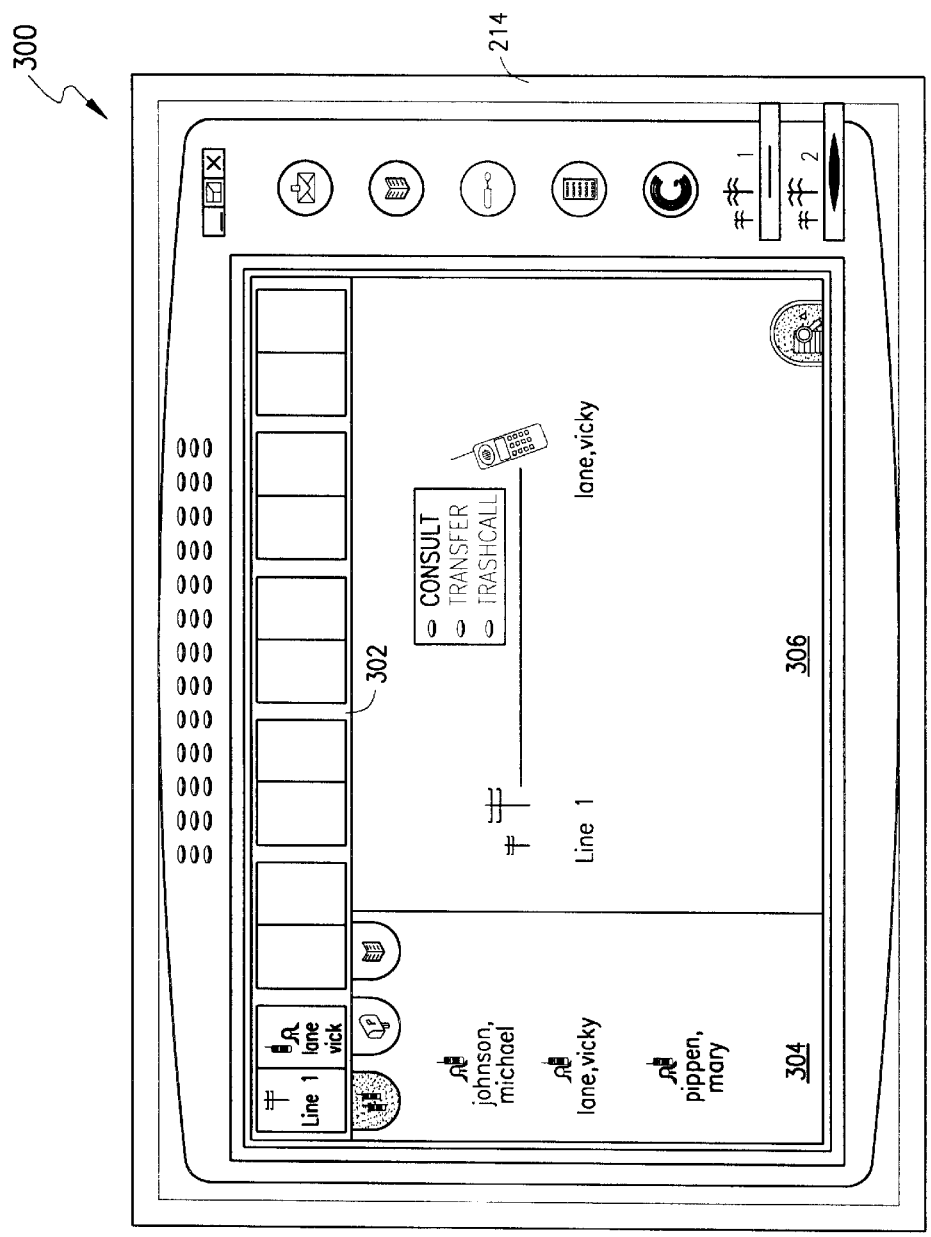
FIG. 7 depicts the call progress screen of FIG. 3 showing a call control from an operator's console feature, in accordance with certain embodiments of the present invention.

As depicted in FIG. 7, the call progress screen and associated application 218 allow the operator to control calls using the GUI. Here, the operator can consult, transfer or trash the incoming call, as described below. Additionally, in accordance with certain preferred embodiments of the present invention, the application 218 includes the capability to allow users to control certain features of incoming calls via the voice commands and/or by using a handset keypad.

The computer telephony system 100, described herein provides several features. For example, using the GUI associated with call progress screen 300, an operator can either route a call to another subscribed handset for a consult/conference call, transfer the call to another subscribed handset, or send the call to a recorded message (e.g., after-hours, trashed, etc.).

Figure 8A:
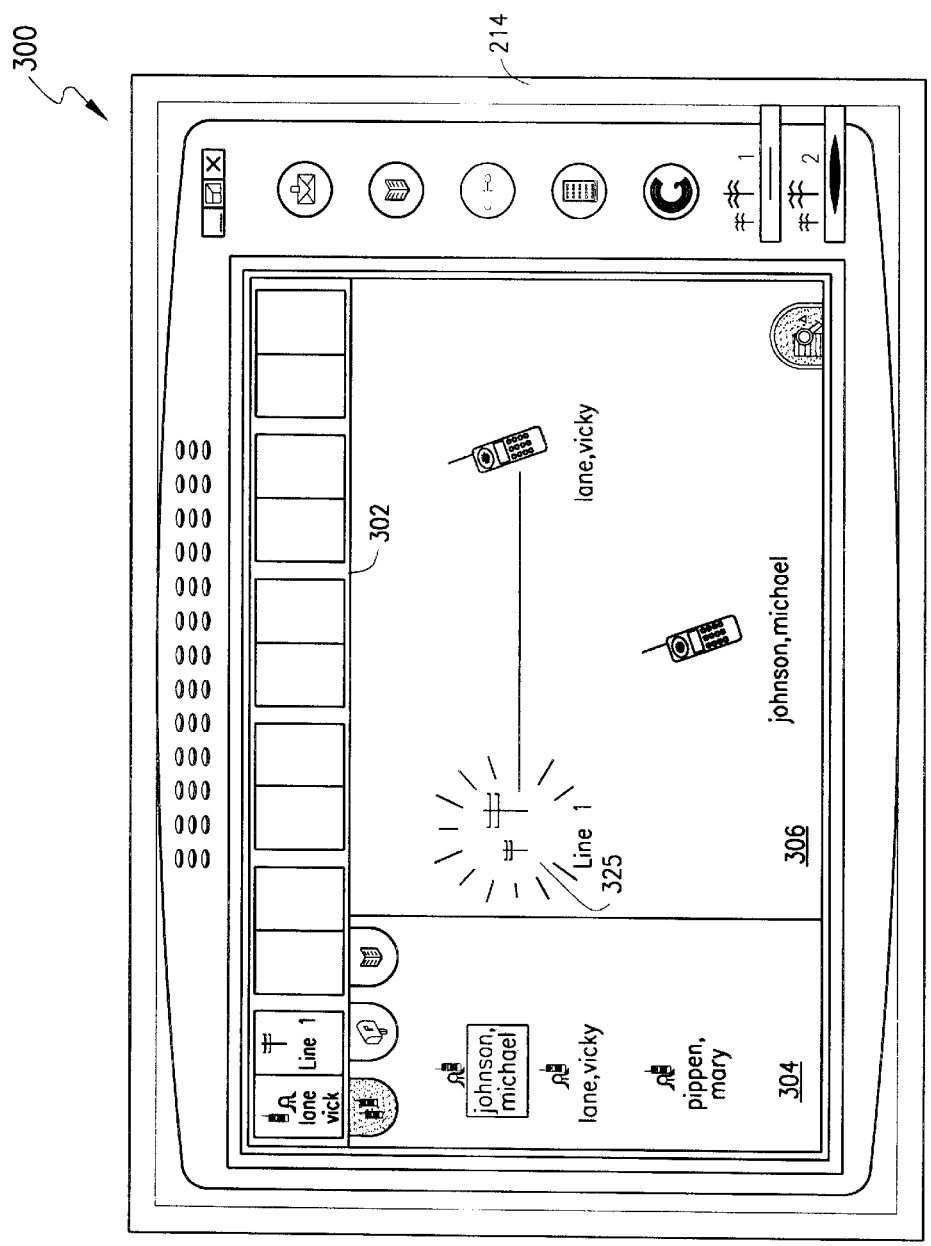
FIGS. 8a–b sequentially depict the call progress screen of FIG. 3 showing a consult operation feature, in accordance with certain embodiments of the present invention.
Figure 8B:
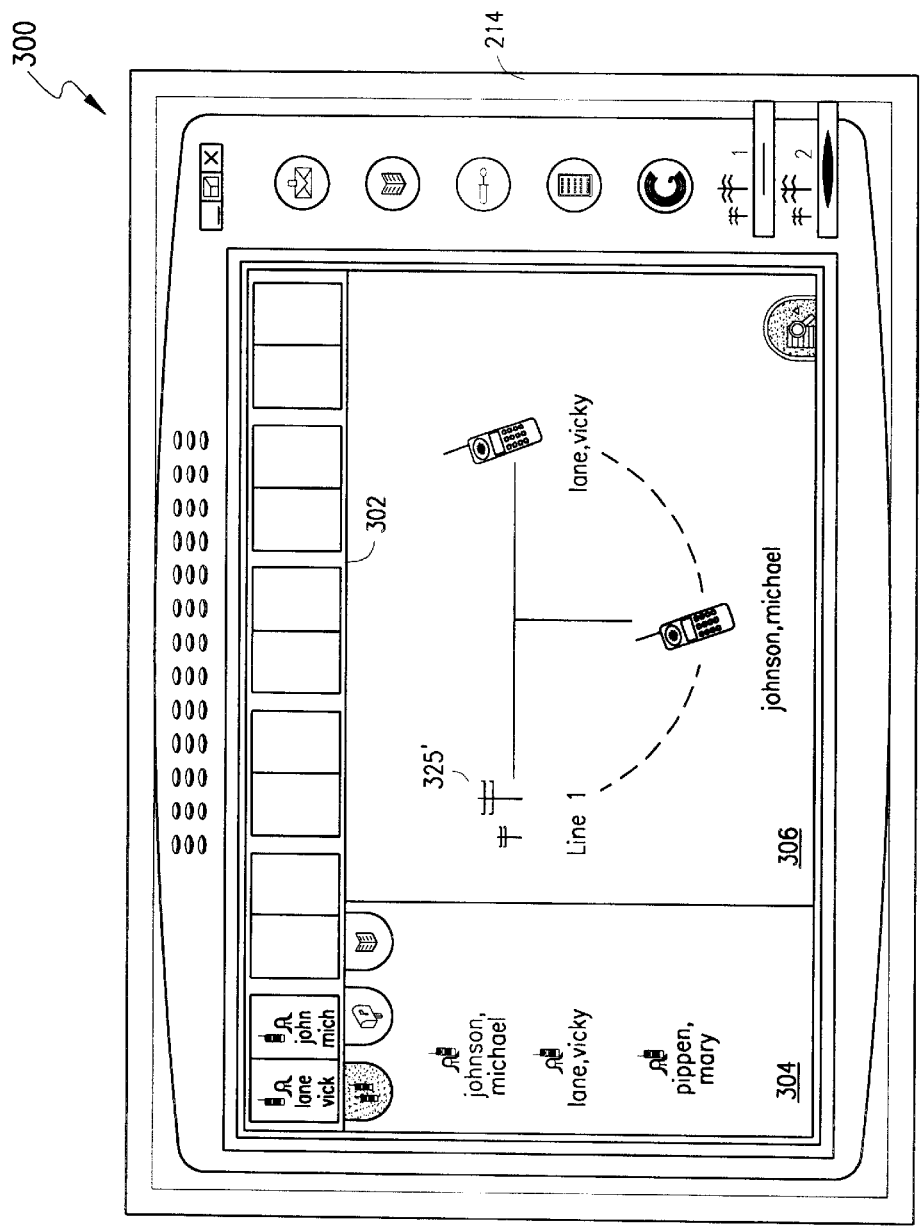

These and other similar features are also provided to users of handsets through voice commands and/or the handset's keypad. By way of example, the call progress screen 300 in FIGS. 8a–b illustrate that the user has selected a consult option and is contacting another subscribed handset to either consult with and/or to include in a conference call. During this process the caller on Line 1 is placed on hold as noted by a flashing of the Line 1 icon 325, as graphically illustrated in FIG. 8a. As such, as depicted in FIG. 8b, a subscribed handset has answered the call and now the call can be either transferred to that handset or included in a conference call. In this configuration icon 325 preferably does not flash.

Figure 9:
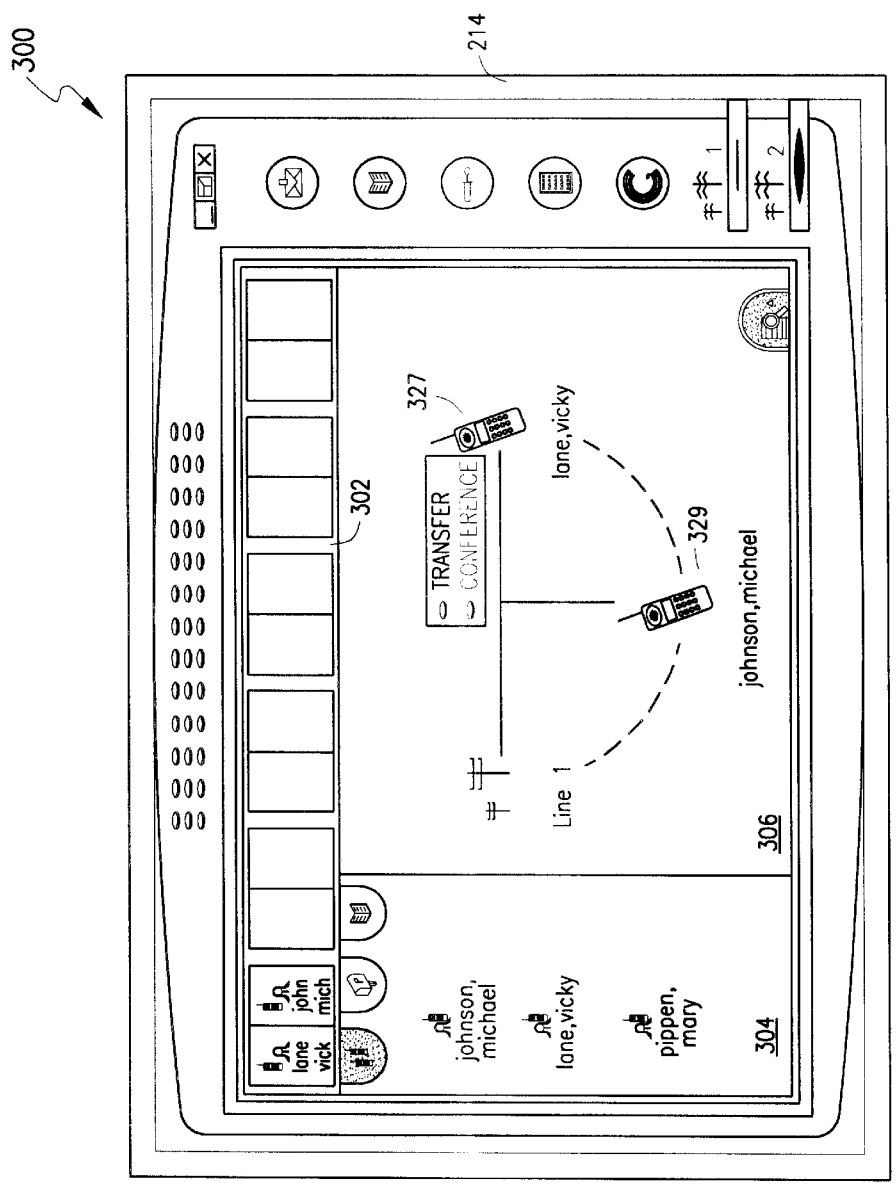
FIG. 9 depicts the call progress screen of FIG. 3 showing a transfer/conference operation feature, in accordance with certain embodiments of the present invention.

Next, as depicted in FIG. 9, once a subscribed handset 329 is contacted via the consult option and the user of the subscribed handset 329 answers the call, then either the consulting user 327 or the operator can select to transfer the call to the subscribed handset 329 that was consulted, or alternatively to include the subscribed handset 329 in a conference call.

Figure 10:
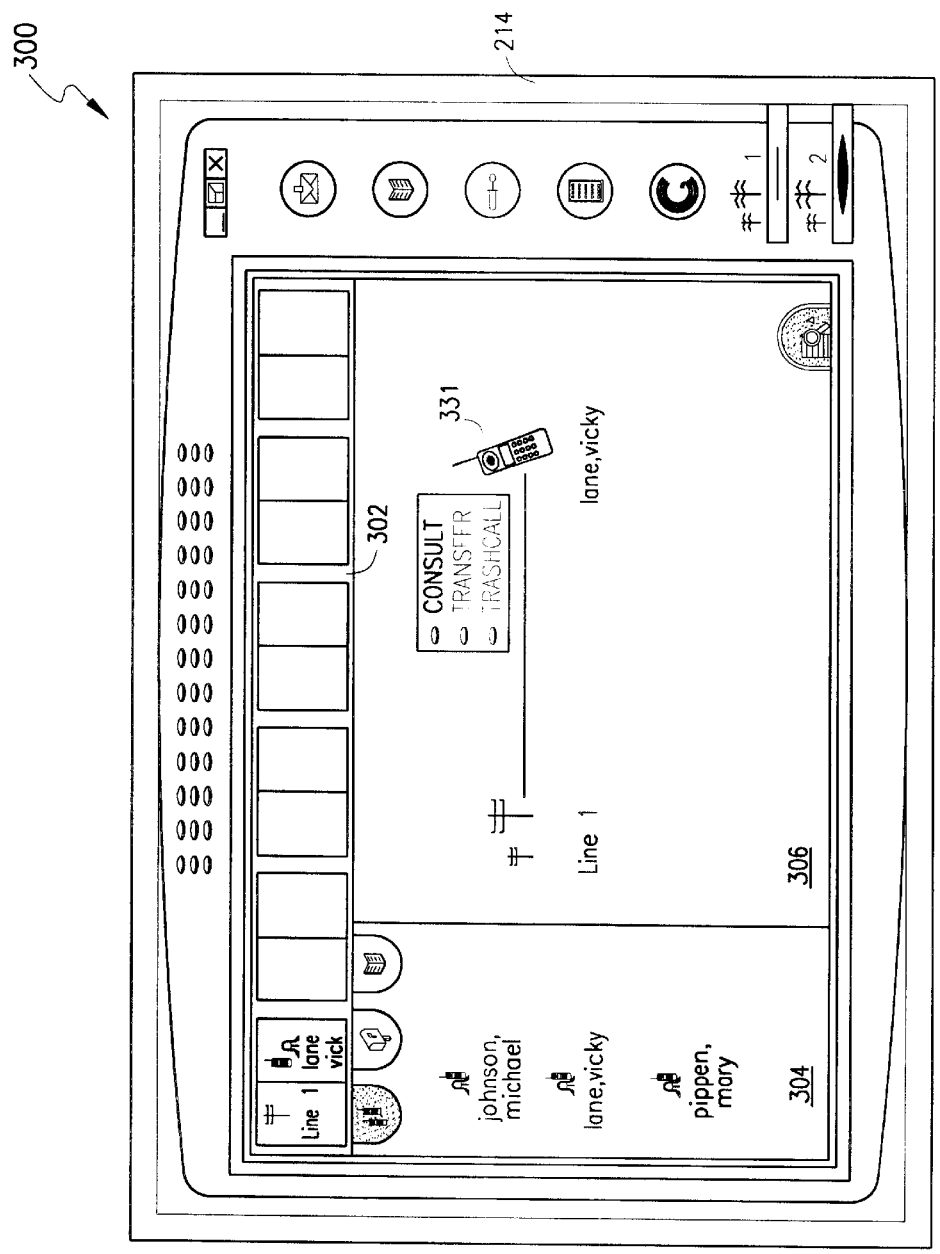
FIG. 10 depicts the call progress screen of FIG. 3 showing a call transfer operation feature in accordance with certain embodiments of the present invention.

FIG. 10 depicts the graphical depiction of a blind transfer operation, wherein a call that is answered by the designated subscribed handset 331 can be transferred to another subscribed handset (not shown) without voice contact between the two handset users.

Figure 11:
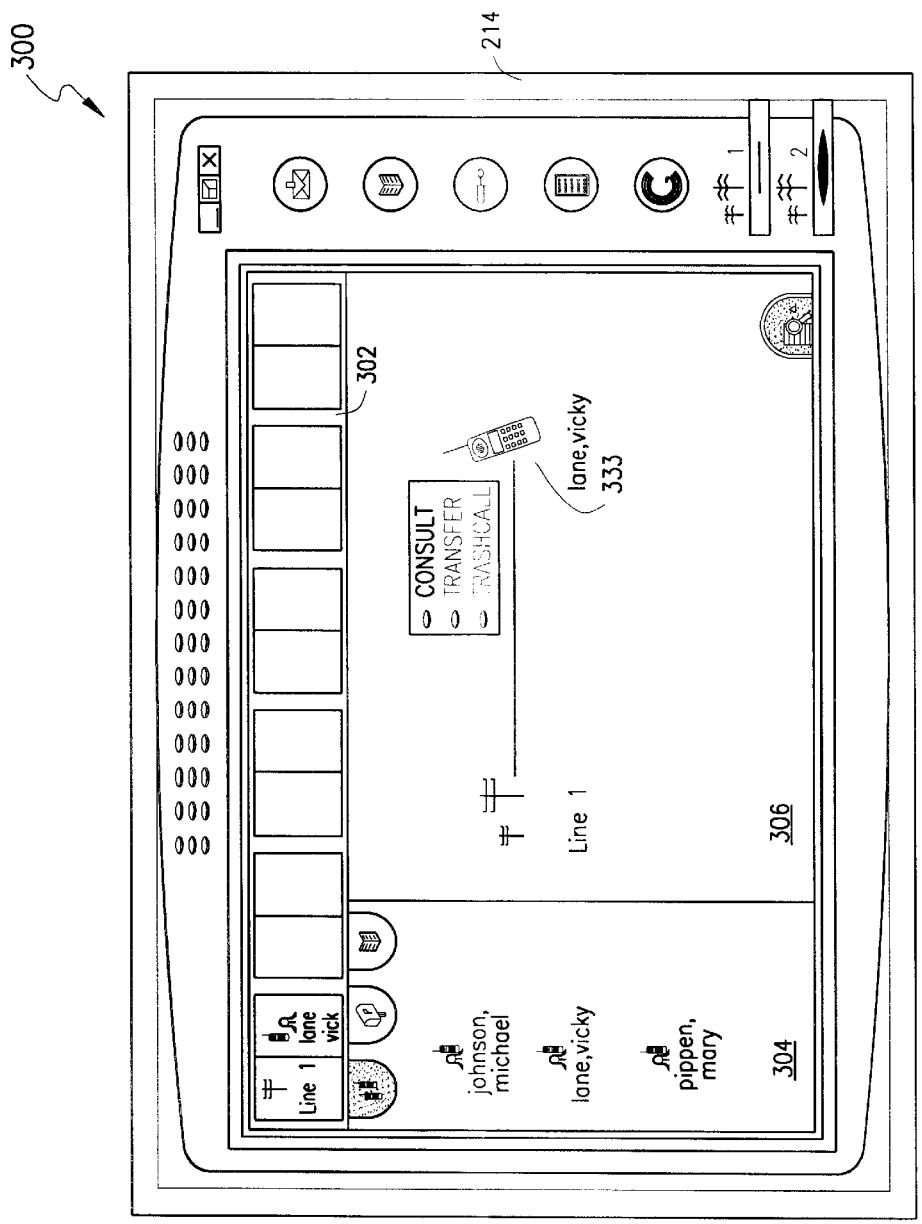
FIG. 11 depicts the call progress screen of FIG. 3 showing a trash call operation feature, in accordance with certain embodiments of the present invention.

Similarly, as depicted in FIG. 11, a trash call can be handled through the GUI or from handset using a trash call option that transfers a call to a pre-recorded message. For example, a trash call message can inform the caller that his call is not accepted by the recipient 333.

As depicted in FIG. 12, the mailboxes tab 308b has been selected and a list of users with a voice mailbox 311 is displayed in resource panel 304. Each of the user mailboxes 311 selectable through the GUI by clicking on the appropriate mailbox icon (e.g. 311a, 311b, etc.).

Figure 13A:
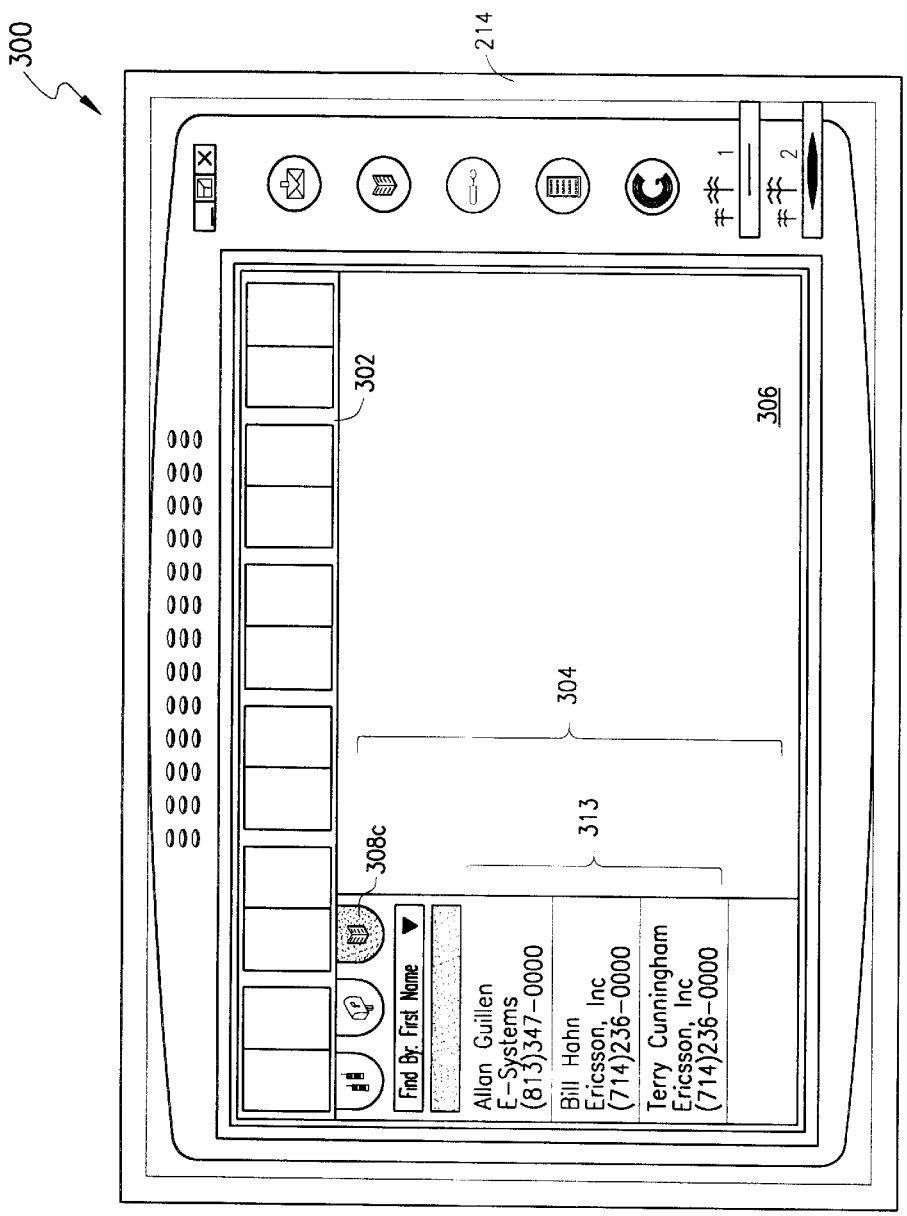
FIGS. 13a–b depict the call progress screen of FIG. 3 showing a list of contacts, and an associated menu for selecting sorting options for use with the list of contacts, respectively, in accordance with certain embodiments of the present invention.
Figure 13B:
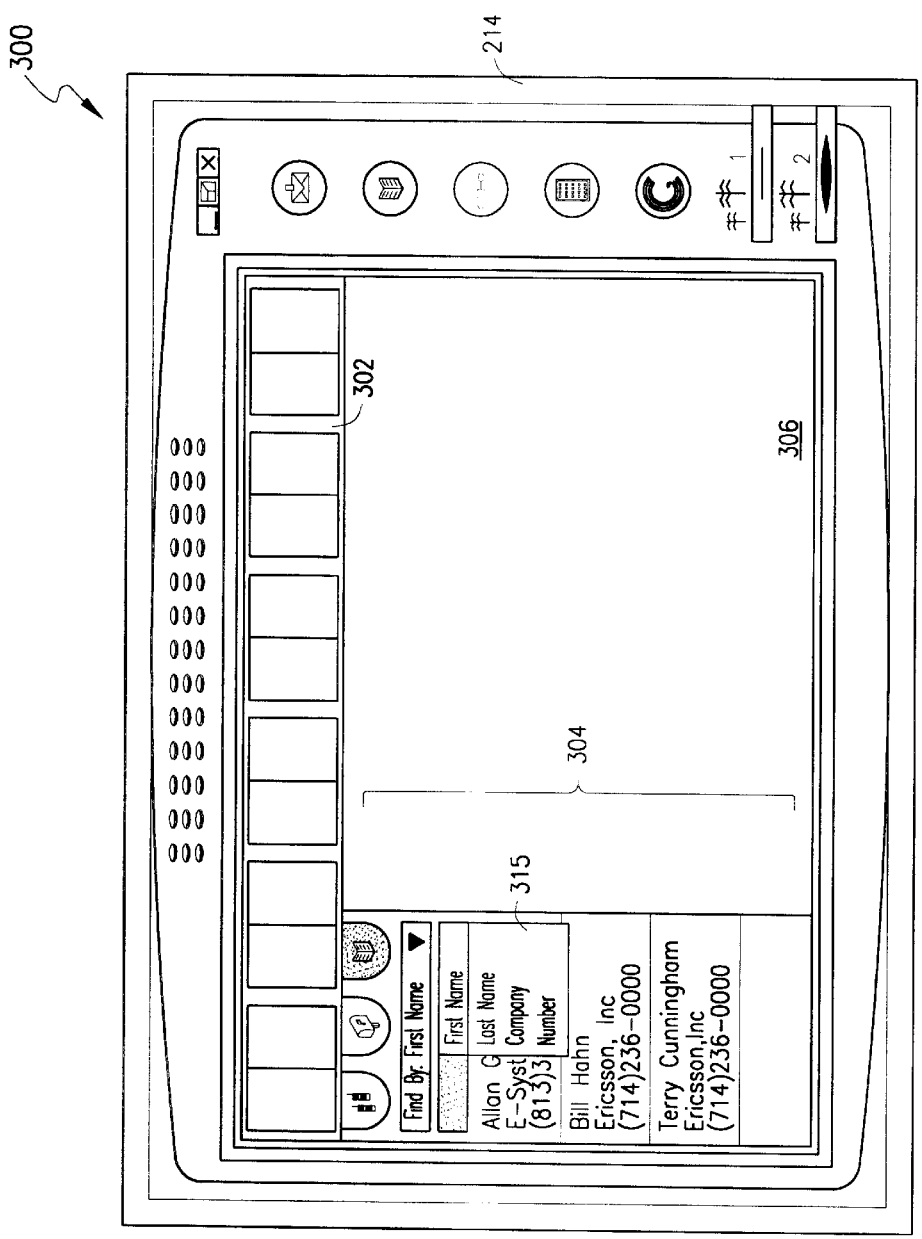

In FIG. 13a, the contacts tab 308c has been selected and a list of contacts 313 is displayed in resource panel 304. The list of contacts 313 can be selected and parsed by the operator using the GUI or alternatively by the users via voice commands and/or handset keypad commands. As depicted in FIG. 13b, for example, the list of contacts 313 can be sorted by either First Name, Last Name, Company Name or Telephone Number.

Figure 14A:
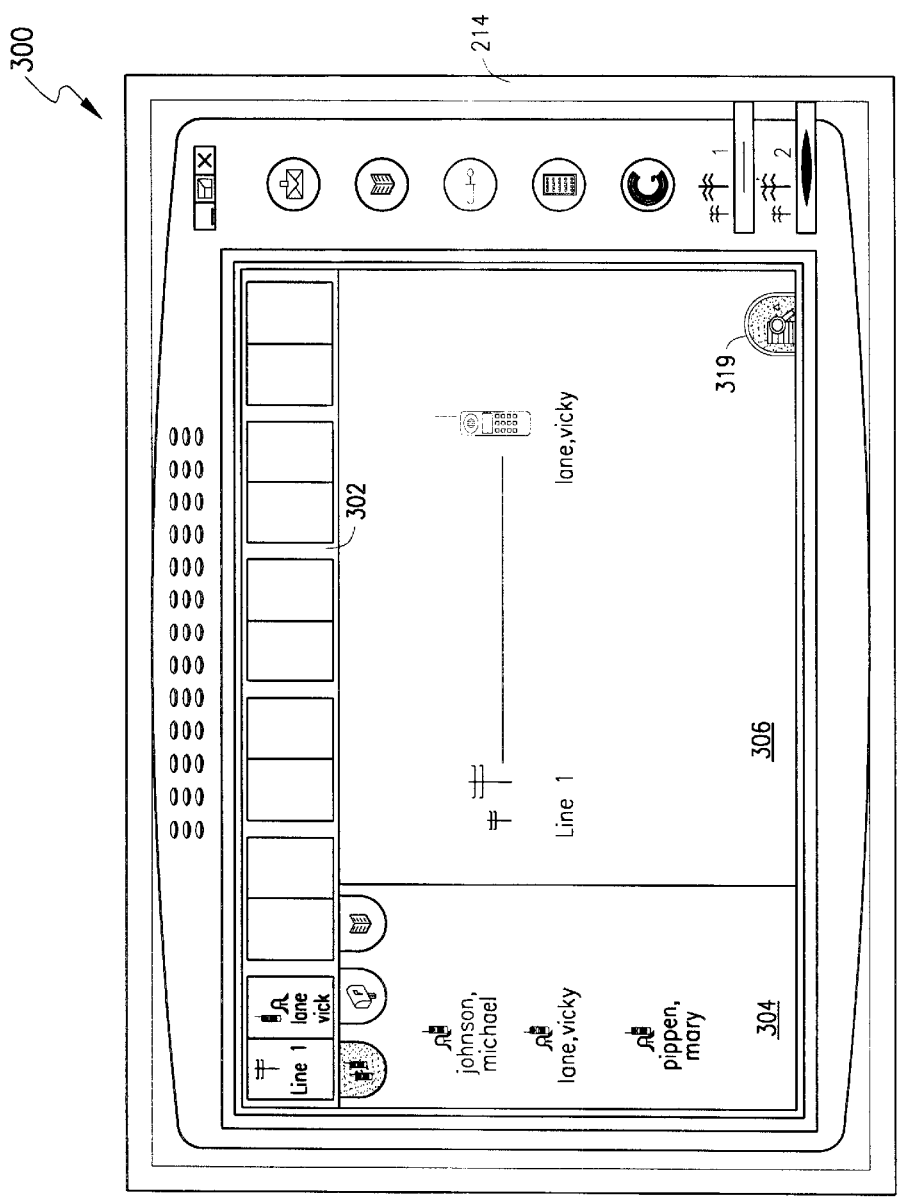
FIG. 14a depicts the call progress screen of FIG. 3 showing an incoming call and a detail selection mechanism, in accordance with certain embodiments of the present invention.
Figure 14B:
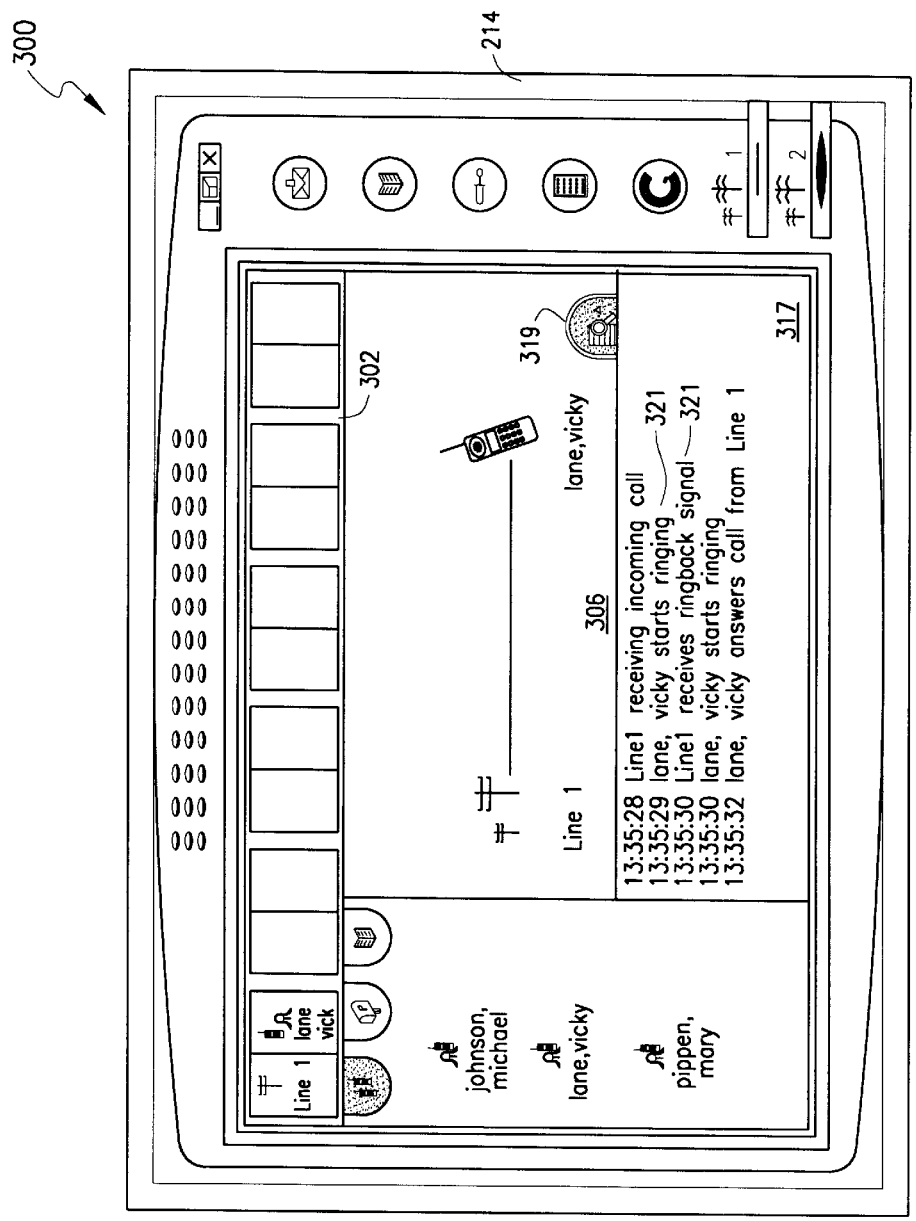
FIG. 14b depicts the call progress screen of FIG. 3 showing additional details for a call, in accordance with certain embodiments of the present invention.

Referring to FIG. 14a, within the main call view area 306 there is a call detail button 319 that can be selected by the operator, for example, to view the call activities as they are happening in the system, or to view call history data. When the call detail button is selected, a call detail area 317 opens up within call progress display 300. Within call detail area 317 are listed various details of the call's progress/history and related activities.

As described above and depicted in the various exemplary embodiments of FIGS. 1–14, computer telephony system 100 includes a GUI application 218 that allows for advanced features typically associated with a PBX, but at a more reasonable cost and with an improved graphical depiction of the operation of the computer telephony system's resources and features. Using such a GUI, operator control and monitor functions are provided through a visually active display that can be easily understood by the operators. This allows operators to better manage incoming and outgoing calls, and to optimize or otherwise adjust the telephony services that are provided to the various users. As new services are added, iconic representations can be incorporated into the object oriented display screens and cells. Further, new lists of these and other services can be added to the resource panel 304.

As will be recognized by those skilled in the art, the innovative concepts described in the present application can be modified and varied over a wide range of applications. For example, the GUI interface and/or various aspects of the exemplary embodiments can be adapted for use in other communication systems, including larger systems, such as, PBXs, and portions of telephone system. Accordingly, the scope of patented subject matter should not be limited to any of the specific exemplary teachings discussed.

What is claimed is:

1. A graphical user interface (GUI) for within a communications system, the graphical user interface comprising:

at least one display device:

a first iconic representation of a calling party;

a second iconic representation of a called party, the second iconic representation being configured to represent at least two different states associated with a call status;

means for displaying the first and second iconic representations on the display device; and an indicia connecting the first iconic representation with the second iconic representation on the display device, said means for displaying the first and second iconic representations on the display device being further configured to display a plurality of visually separated areas on the display device, including at least a first area capable of displaying the first and second iconic representations and a second area comprising a resource panel, said resource panel including a plurality of selectable tabs.

2. The graphical user interface (GUI) as recited in claim 1, wherein the first iconic representation of a calling party further includes an identifier of the calling party.

3. The graphical user interface (GUI) as recited in claim 1, wherein the second iconic representation of the called party further includes an identifier of the called party.

4. The graphical user interface (GUI) as recited in claim 1, further comprising a graphical representation visually connecting the first iconic representation with the second iconic representation on the display device.

5. The graphical user interface (GUI) as recited in claim 1, wherein at least one of the plurality of selectable tabs, when selected causes the means for displaying the first and second iconic representations on the display device to further display at least one list on the display device in the second area.

6. The graphical user interface (GUI) as recited in claim 5, wherein the at least one list is selected from the group consisting of a list of handset users, a list of voice mailbox users, and a list of contacts.

7. The graphical user interface (GUI) as recited in claim 1, further comprising a means for inputting user selections that cause the means for displaying the first and second iconic representations on the display device to change at least a portion of the representations in the display device.

8. The graphical user interface (GUI) as recited in claim 1, further comprising a call detail area for displaying a list of events related to a call.

9. The graphical user interface (GUI) as recited in claim 1, wherein iconic representations of additional call participants are displayed using a chronologic representation.

10. A method for displaying call progress information on an operator display screen within a communications system, the method comprising:

displaying a first iconic representation of a calling party;

displaying a second iconic representation of a called party, the second iconic representation being configured to represent at least two different states associated with a call status;

connecting the first iconic representation and the second iconic representation with an indicia on the display screen;

displaying the first and second iconic representations in a first area visually separated from at least a second area on the display device; and display a resource panel within the second area, said step of displaying the resource panel further comprising, displaying at least one selectable tab within the resource panel.

11. The method as recited in claim 10, further comprising displaying an identifier of the calling party associated with the first iconic representation of the calling party.

12. The method as recited in claim 10, further comprising displaying an identifier of the called party associated with the second iconic representation of the called party.

13. The method as recited in claim 10, further comprising displaying a graphical representation that visually connects the first iconic representation with the second iconic representation.

14. The method as recited in claim 10, further comprising displaying at least one list on the display device in the second area when the tab is activated.

15. The method as recited in claim 14, wherein the at least one list is selected from the group consisting of a list of handset users, a list of voice mailbox users, and a list of contacts.

16. The method as recited in claim 10, further comprising accepting user selections and in response changing at least a portion of the representations on the display device.

17. The method as recited in claim 10, further comprising the step of displaying a list of events related to a call.

18. The method as recited in claim 10, wherein iconic representations of additional call participants are displayed using a chronologic representation.

19. A computer readable medium comprising at least one computer instruction that causes at least one processor within a communications system to perform operations including:
    displaying a first iconic representation of a calling party on a display device coupled to the processor;
    displaying a second iconic representation of a called party on a display device coupled to the processor, the second iconic representation being configured to represent at least two different states associated with a call status;
    connecting the first iconic representation and the second iconic representation with an indicia on the display device;
    displaying the first and second iconic representations in a first area that is visually separated from at least a second area on the display device;
    displaying a resource panel within the second area; and
    displaying at least one selectable tab within the resource panel.

20. The computer readable medium as recited in claim 19, further comprising at least one computer instruction that causes at least one processor within the communications system to perform operations including:
    displaying an identifier of the calling party associated with the first iconic representation of the calling party.

21. The computer readable medium as recited in claim 19, further comprising at least one computer instruction that causes at least one processor within the communications system to perform operations including:
    displaying an identifier of the called party associated with the second iconic representation of the called party.

22. The computer readable medium as recited in claim 19, further comprising at least one computer instruction that causes at least one processor within the communications system to perform operations including:
    displaying a graphical representation that visually connects the first iconic representation with the second iconic representation.

23. The computer readable medium as recited in claim 19, further comprising at least one computer instruction that causes at least one processor within the communications system to perform operations including:
    displaying at least one list on the display device in the second area when the tab is activated.

24. The computer readable medium as recited in claim 23, wherein the at least one list is selected from a group consisting of a list of handset users, a list of voice mailbox users, and a list of contacts.

25. The computer readable medium as recited in claim 19, further comprising at least one computer instruction that causes at least one processor within the communications system to perform operations including:
    accepting user selections; and
    in response, causing at least one of the first and second iconic representations to change.

26. The computer readable medium as recited in claim 19, further comprising at least one computer instruction that causes at least one processor within the communications system to perform operations including:
    displaying a list of events related to a call in a call detail area.

27. The computer readable medium as recited in claim 19, wherein iconic representations of additional call participants are displayed using a chronologic representation.

* * * * *

UNITED STATES PATENT AND TRADEMARK OFFICE
CERTIFICATE OF CORRECTION

PATENT NO. : 6,278,454 B1 Page 1 of 1
DATED : August 21, 2001
INVENTOR(S) : Shankarnarayan Kirshnan It is certified that error appears in the above-identified patent and that said Letters Patent is hereby corrected as shown below:

<u>Column 9,</u>
Line 61, replace ":" with -- ; --

<u>Column 10,</u>
Line 58, replace "display" with -- displaying --

Signed and Sealed this

Eleventh Day of March, 2003

JAMES E. ROGAN
*Director of the United States Patent and Trademark Office*